United States Patent
Kosugi et al.

(10) Patent No.: US 8,625,230 B2
(45) Date of Patent: Jan. 7, 2014

(54) POSITION DEMODULATOR AND POSITION DEMODULATION METHOD

(75) Inventors: Tatsuhiko Kosugi, Tokyo (JP); Kazuhiko Takaishi, Tokyo (JP); Takeshi Hara, Tokyo (JP); Hiroshi Oyabu, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 49 days.

(21) Appl. No.: 13/370,230

(22) Filed: Feb. 9, 2012

(65) Prior Publication Data

US 2012/0293885 A1 Nov. 22, 2012

(30) Foreign Application Priority Data

May 20, 2011 (JP) ................................. 2011-114160

(51) Int. Cl.
*G11B 20/20* (2006.01)
(52) U.S. Cl.
USPC ............................. 360/76; 360/29; 360/77.07
(58) Field of Classification Search
None
See application file for complete search history.

(56) References Cited

U.S. PATENT DOCUMENTS

| | | | |
|---|---|---|---|
| 6,188,539 B1 | 2/2001 | Elliot et al. | |
| 7,457,066 B2 | 11/2008 | Ehrlich et al. | |
| 7,719,781 B2 | 5/2010 | Ehrlich et al. | |
| 2001/0046103 A1* | 11/2001 | Kosugi | 360/78.14 |
| 2004/0190173 A1* | 9/2004 | Shimatani | 360/77.02 |
| 2007/0279786 A1 | 12/2007 | Ehrlich et al. | |
| 2008/0239553 A1* | 10/2008 | Myouga et al. | 360/77.01 |
| 2009/0040641 A1 | 2/2009 | Ehrlich et al. | |
| 2010/0073807 A1* | 3/2010 | Kosugi | 360/76 |
| 2010/0302675 A1* | 12/2010 | Kosugi et al. | 360/77.02 |
| 2012/0314321 A1* | 12/2012 | Oyabu et al. | 360/75 |

FOREIGN PATENT DOCUMENTS

| | | |
|---|---|---|
| JP | 03-076068 | 4/1991 |
| JP | 11-353831 | 12/1999 |
| JP | 2001-520430 | 10/2001 |
| JP | 2002-516451 | 6/2002 |
| JP | 2007-323798 | 12/2007 |
| JP | 2008-234834 | 10/2008 |
| WO | 99/19866 | 4/1999 |
| WO | WO-99/60571 | 11/1999 |

OTHER PUBLICATIONS

Japanese Office Action dated Aug. 28, 2012, filed in Japanese counterpart Application No. 2011-114160, 5 pages (including translation).

* cited by examiner

*Primary Examiner* — Thang Tran
(74) *Attorney, Agent, or Firm* — Patterson & Sheridan LLP

(57) ABSTRACT

According to one embodiment, a position demodulator includes a demodulator, a phase corrector, and a position demodulating module. The demodulator demodulates a first demodulated signal and a second demodulated signal having a phase difference of 90 degrees from the first demodulated signal as a result of discrete Fourier transform operation on a read signal of a null servo pattern recorded in a servo area of a medium read out by a head. The phase corrector carries out correction to tilt respective vectors of the first demodulated signal and the second demodulated signal represented on a phase plane by a predetermined angle. The position demodulating module demodulates a positional signal for determining the position of the core of the head based on the first demodulated signal and the second demodulated signal corrected by the phase corrector.

10 Claims, 13 Drawing Sheets

| 0<A | 0<B | |B|<|A| | DOMAIN | X | POSITION CALCULATING METHOD |
|---|---|---|---|---|---|
| Y | Y | Y | 1 | |B|/|A| | func(x) |
| Y | Y | N | 2 | |A|/|B| | 0.5-func(x) |
| N | Y | N | 3 | |A|/|B| | 0.5+func(x) |
| N | Y | Y | 4 | |B|/|A| | 1-func(x) |
| N | N | Y | 5 | |B|/|A| | 1+func(x) |
| N | N | N | 6 | |A|/|B| | 1.5-func(x) |
| Y | N | N | 7 | |A|/|B| | 1.5+func(x) |
| Y | N | Y | 8 | |B|/|A| | 2.0-func(x) |

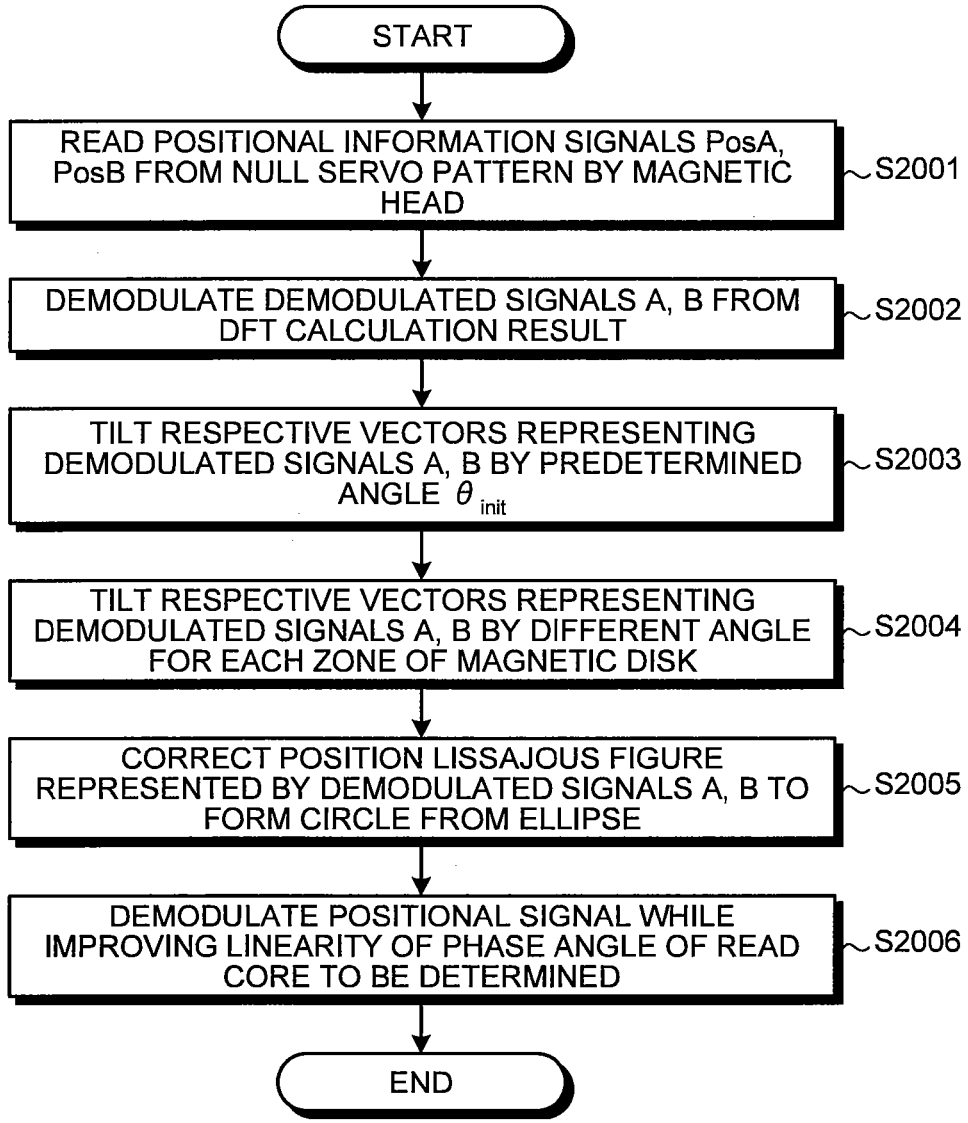

US 8,625,230 B2

POSITION DEMODULATOR AND POSITION DEMODULATION METHOD

CROSS-REFERENCE TO RELATED APPLICATIONS

This application is based upon and claims the benefit of priority from Japanese Patent Application No. 2011-114160, filed May 20, 2011, the entire contents of which are incorporated herein by reference.

FIELD

An embodiment described herein relates generally to a position demodulator and a position demodulation method.

BACKGROUND

Hard disk drive devices write data or the like to a recording medium using an actuator arm with a head provided to the tip of the actuator arm. The recording medium has data areas to store user data and servo areas to store data used for positioning control of the head.

In such a hard disk drive device, when the head passes over a servo area, the position of the head is determined based on a signal read out from the servo area. The arm adjusts the head position based on the position determined. Thus, the head can be controlled to be located at a desired position.

There are several types of patterns recorded in the servo areas including, for example, null servo patterns, area servo patterns, and phase servo patterns.

For example, a null servo pattern is provided with two blocks of different magnetization patterns. By a positional information signal read out from the two blocks, the position of the head can be determined. Because the null servo pattern only needs two blocks, less servo areas are required, and therefore, data areas are easily secured. There has been disclosed conventional technology related to such the null servo pattern.

In such the hard disk drive device, upon determining the position of the head based on positional information read out from a pattern in the servo area, it is difficult to accurately determine the position of the head using only the conventional technology. This is because it is difficult to associate a read signal with the position of the head with a smooth correspondence relation due to specifications, operational circumstances, and the like of the hard disk drive device. This applies not only to demodulation of a position using a null servo pattern, but also to demodulation using other servo patterns. Therefore, in the hard disk drive device, the read signal needs to be corrected to accurately determine the position of the head.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

FIG. 17 is an exemplary flowchart of the process of determining the position of a magnetic head in the disk storage device in the embodiment.

DETAILED DESCRIPTION

In general, according to one embodiment, a position demodulator comprises a demodulator, a phase corrector, and a position demodulating module. The demodulator is configured to demodulate a first demodulated signal and a second demodulated signal having a phase difference of 90 degrees from the first demodulated signal as a result of discrete Fourier transform operation on a read signal of a null servo pattern recorded in a servo area of a medium read out by a head. The phase corrector is configured to carry out correction to tilt respective vectors of the first demodulated signal and the second demodulated signal represented on a phase plane by a predetermined angle. The position demodulating module is configured to demodulate a positional signal for determining the position of the core of the head based on the first demodulated signal and the second demodulated signal corrected by the phase corrector.

Figure 1:
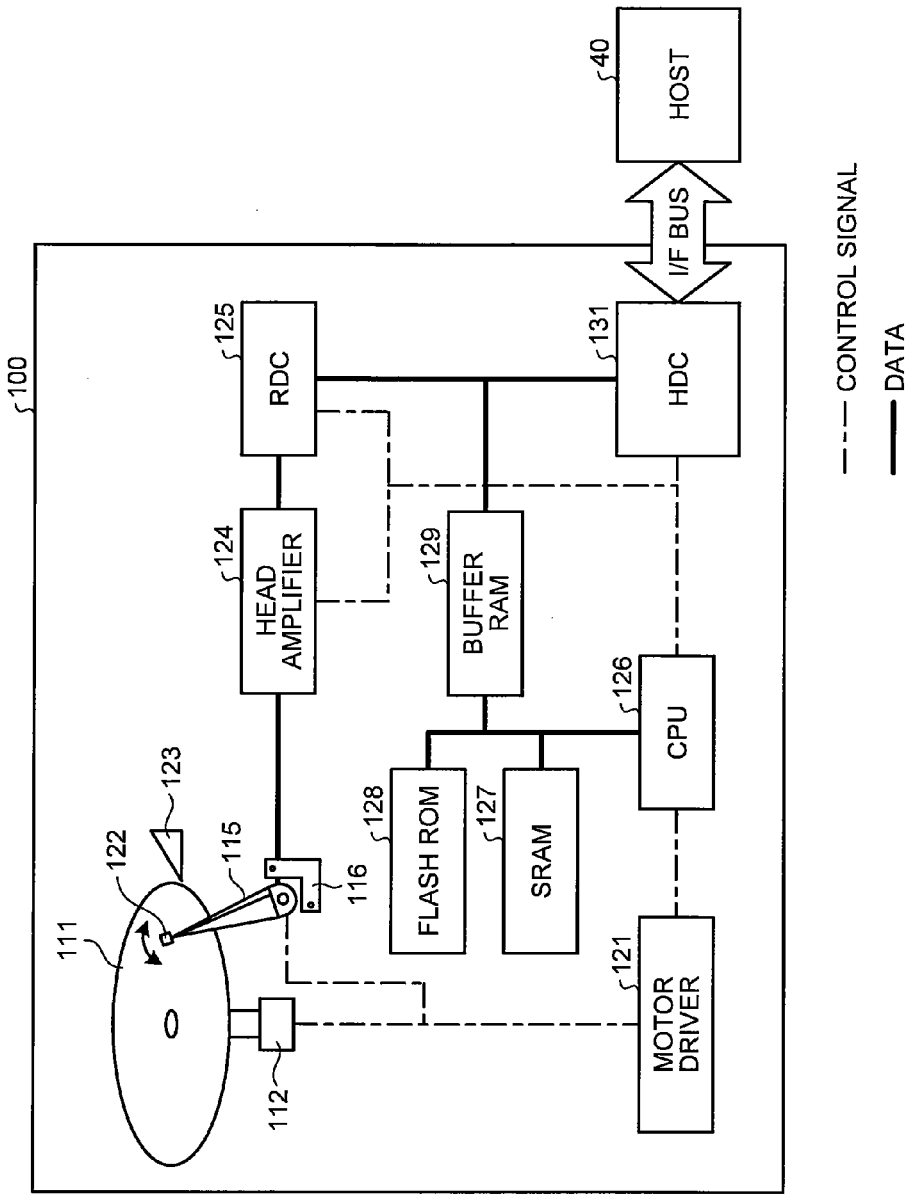
FIG. 1 is an exemplary block diagram of an electrical hardware configuration of a disk storage device according to an embodiment.

A disk storage device 100 that employs a position demodulator according to an embodiment will be described. FIG. 1 is a schematic block diagram of an electrical hardware configuration of the disk storage device 100 of the embodiment.

In FIG. 1, a magnetic disk 111 is a disk-shaped recording medium, and is rotated by a spindle motor 112 about the rotation axis at a predetermined rotational speed. The spindle motor 112 is rotated by a motor driver 121.

A magnetic head 122 writes data to and reads data from the magnetic disk 111 by a recording head and a reproducing head provided therewith, respectively. The magnetic head 122 is located at the tip of an actuator arm 115, and is moved in the radial direction of the magnetic disk 111 by a voice coil motor (VCM) 116 driven by the motor driver 121. When the rotation of the magnetic disk 111 is stopped and the like, the magnetic head 122 is retracted on a ramp 123.

A head amplifier 124 amplifies a signal read out by the magnetic head 122 from the magnetic disk 111, and outputs the signal to feed it to a read-write channel (RDC) 125. The head amplifier 124 further amplifies a signal supplied from the RDC 125 for writing data to the magnetic disk 111, and feeds the amplified signal to the magnetic head 122.

The RDC 125 carries out code modulation on data supplied from a hard disk controller (HDC) 131, which will be described later, to be written to the magnetic disk 111, and feeds it to the head amplifier 124. The RDC 125 further carries out code demodulation on a signal read out from the magnetic disk 111 and fed from the head amplifier 124, and outputs it to the HDC 131 as digital data.

A CPU 126 is connected with a static random access memory (SRAM) 127 that is a working memory, a flash read only memory (ROM) 128 that is a non-volatile memory, and a buffer RAM 129 for temporary storage. The CPU 126 controls the overall operation of the disk storage device 100 in accordance with firmware stored in advance in the flash ROM 128 and the magnetic disk 111.

The HDC 131 controls data exchange with a host computer (host) 40 via an I/F bus, controls the buffer RAM 129, corrects errors in recorded data, and the like. The buffer RAM 129 is used as a cache for the data sent and received with the host computer 40.

The detail of the magnetic disk 111 will be explained. The magnetic disk 111 has a data area where user data is recorded and a servo area where servo information and the like is recorded. In the servo area, servo patterns extending in circular arcs in a radial direction from the rotation center are recorded. The servo pattern is the data used for positioning the magnetic head 122.

The magnetic disk 111 is a recording medium comprising a substrate made of metal or glass in a disk shape and a magnetic film formed thereon. To record data onto the magnetic disk 111, a magnetic field is applied from the magnetic head 122 to a recording area where data is recorded on the magnetic disk 111 to make a magnetized state of magnetic materials on the surface thereof changed, thereby recording the data. To read out and reproduce data from the magnetic disk 111, the magnetic head 122 is moved to a recorded area of intended reproduction on the magnetic disk 111 and the magnetized state of magnetic materials of the magnetic disk 111 is read out to reproduce the data. The recording method of the magnetic disk 111 may be either of perpendicular magnetic recording method or horizontal magnetic recording method.

In the embodiment, as a method for determining the position of the magnetic head 122, null demodulation, i.e., demodulation with a null servo pattern, is used. A servo pattern in the servo area is configured to have a preamble section, a servo mark (SM) section, a Gray code section, and a burst section. The preamble section corresponds to a leading portion of a servo pattern, and in the embodiment, it is defined as an area of 4T cycles. The burst section is an area for detecting an offset position of the magnetic head 122 from the center of a track in each track. When null demodulation is used, the burst section has two blocks (hereinafter, referred to as a null pattern). In the embodiment, the burst section is defined as an area of 8T cycles. When the cycle of the preamble section is defined as 4T and that of the burst section is defined as 8T, the frequency is doubled. Therefore, when null demodulation is used as in the disk storage device 100 of the embodiment, correction based on a difference in frequency between an initial phase of the preamble section and a null pattern in the burst section is necessary.

Figure 2:
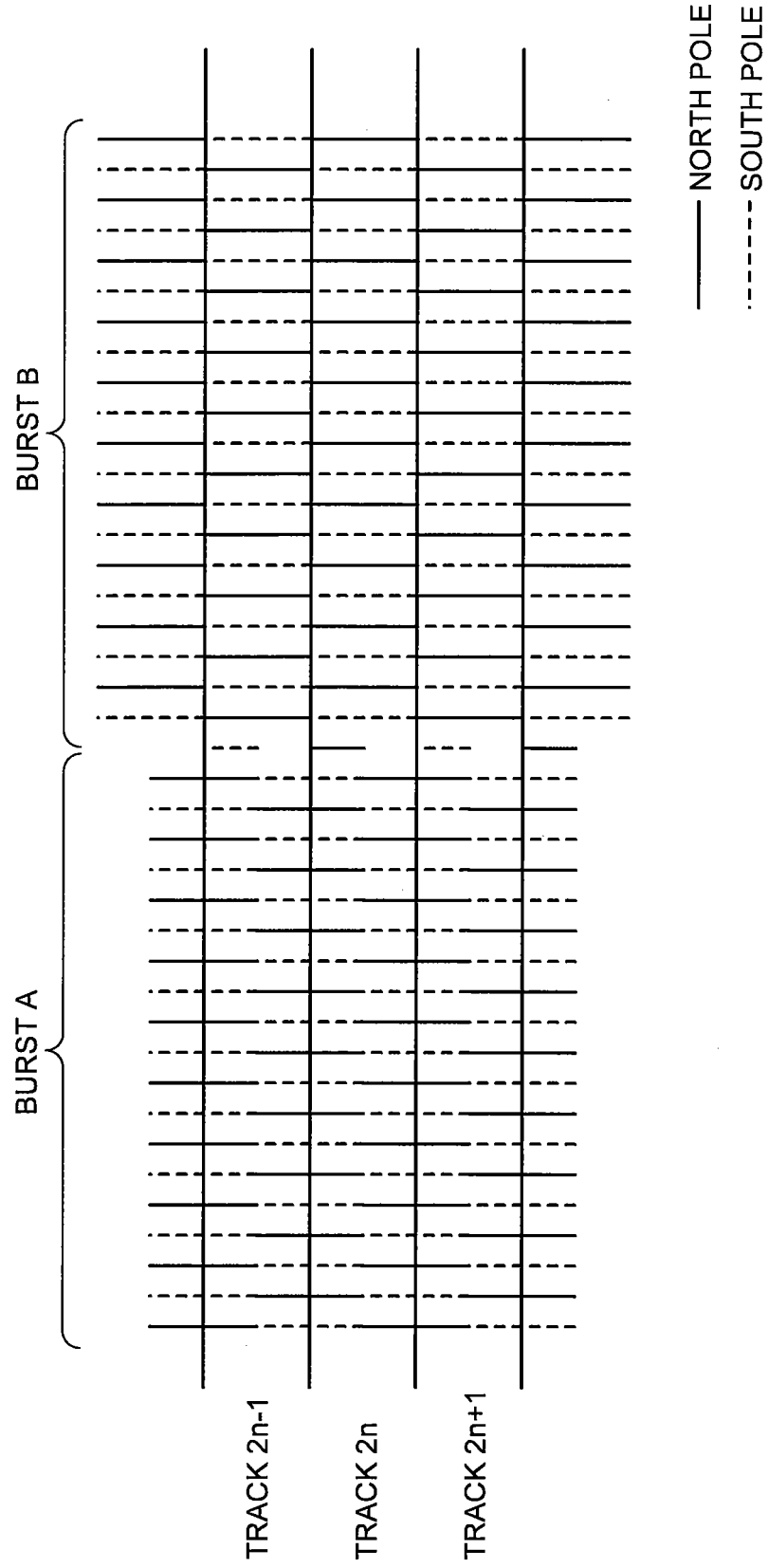
FIG. 2 is an exemplary diagram of a pattern in a burst section of a magnetic disk in the case of null demodulation in the embodiment.

The burst section of the magnetic disk 111 will be described specifically. FIG. 2 illustrates an example of a pattern in a burst section of the magnetic disk 111 in the case of null demodulation. As illustrated in FIG. 2, a null pattern in two phases is formed in the burst section. As illustrated in FIG. 2, the null pattern is arranged with north poles and south poles alternately. Accordingly, accessing a null pattern by a read core of the magnetic head 122 allows reading out a signal the waveform of which changes in cycles formed by those north poles and south poles.

In the embodiment, as a null pattern of two phases, a burst A for a positional information signal PosA and a burst B for a positional information signal PosB that is shifted in phase by 90 degrees from the positional information signal PosA are recorded. More specifically, as illustrated in FIG. 2, the interval of tracks for the burst A and the burst B is shifted by half a track. Because of this, the amplitude of waveforms is configured to be different between a signal readout from the burst A by the magnetic head 122 and a signal read out from the burst B. Therefore, in the disk storage device 100 of the embodiment, from the difference in amplitude of waveforms for signals of the burst A and the burst B, an offset position (hereinafter, also referred to as position) of the read core of the magnetic head 122 can be determined.

In the disk storage device 100 of the embodiment, correction is carried out on demodulated signals obtained from discrete Fourier transform (DFT) operation on a positional information signal PosA and a positional information signal PosB recorded in a burst section, and from the demodulated signals after the correction, a positional signal (a signal that can determine an offset position) of the magnetic head 122 from the track center of a track number detected is demodulated.

Figure 3:
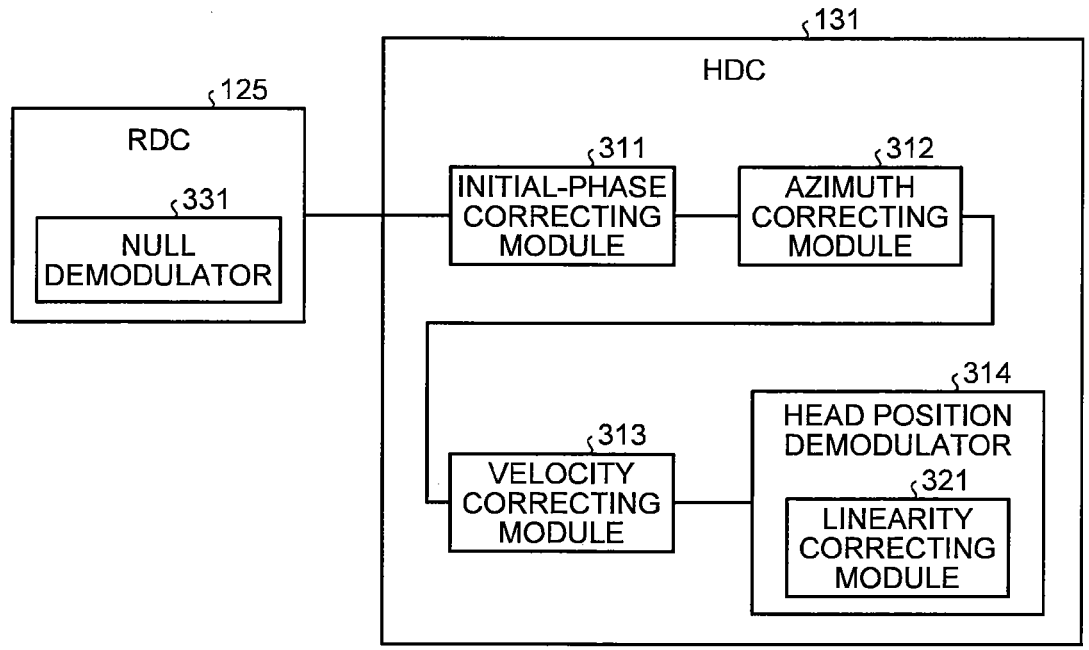
FIG. 3 is an exemplary block diagram of a configuration to demodulate a position in a read-write channel (RDC) and a hard disk controller (HDC) in the embodiment.

A configuration to demodulate position will be explained. FIG. 3 is a block diagram of a configuration to demodulate a position in the RDC 125 and the HDC 131.

The RDC 125 comprises a null demodulator 331. The null demodulator 331 carries out a discrete Fourier transform (DFT) operation on positional information signals PosA and PosB that are signals of a null servo pattern recorded in the servo area of the magnetic disk 111 read out by the magnetic head 122. The null demodulator 331 then demodulates, as a result of the DFT operation, a demodulated signal A (a first demodulated signal) and a demodulated signal B (a second demodulated signal). The demodulated signal A and the demodulated signal B have a phase difference of 90 degrees from each other. The demodulated signal A and the demodulated signal B obtained by demodulation are represented as respective vectors, each containing a sine component and a cosine component.

In conventional magnetic disk devices, a phase angle θ can be obtained from a direction of a vector represented on a phase plane by using a sine component of the demodulated signal A as an X-coordinate and a sine component of the demodulated signal B as a Y-coordinate. An offset position of the magnetic head 122 is determined based on the phase angle θ. The sine component of the demodulated signal A and the sine component of the demodulated signal B used for determining the offset position will be explained.

Figure 4:
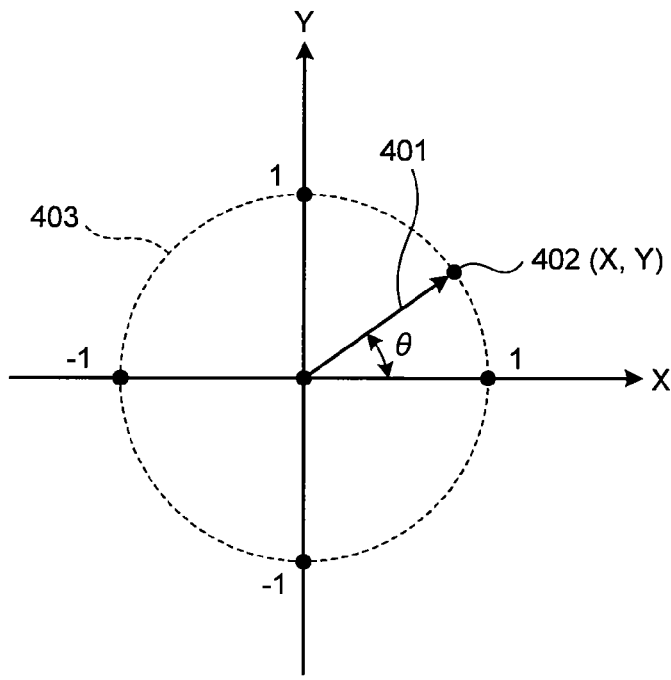
FIG. 4 is an exemplary chart illustrating a vector formed in a phase space when a sine component of a demodulated signal A is used on an X-coordinate and a sine component of a demodulated signal B is used on a Y-coordinate in the embodiment.

FIG. 4 illustrates a vector represented in a phase space after assigning a sine component of the demodulated signal A on an X-coordinate and a sine component of the demodulated signal B on a Y-coordinate. In the phase space illustrated in FIG. 4, plotting a sine component of the demodulated signal A and a sine component of the demodulated signal B sampled at a predetermined timing in the phase space provides a terminal 402 of a vector 401. The extracting timing of samples is conceivable, for example, to be carried out at eight samples per 2π for six cycles (12π).

The vector 401 rotates in a counter-clockwise direction on a circle indicated by a broken line along with changes made when the magnetic head 122 is moved in the radial direction at a constant speed. The circumference of a circle 403 that the terminal 402 of the vector 401 draws holds samples of sine components of the demodulated signal A and sine components of the demodulated signal B obtained by the move of the magnetic head 122 in the radial direction. Thus, plotting the results of samples held in a phase space provides a position Lissajous figure, i.e., a Lissajous figure by head position.

A position Lissajous figure is drawn as a circle illustrated in FIG. 4 when the demodulated signals A and B are sinusoidal waveforms. However, when a position Lissajous figure is drawn using actually obtained the demodulated signals A and B, there are various distortions caused. For example, saturation at a peak causes distortion resulting not in a sinusoidal waveform, and thus the position Lissajous figure may not be formed in a circle as indicated in broken line in FIG. 4 and may result in a deformed rectangular shape with rounded corners. Therefore, in the disk storage device 100 of the embodiment, it is determined that various types of corrections are carried out such that the demodulated signals A and B draw an appropriate position Lissajous figure.

In the embodiment, the concepts of various types of corrections carried out in the HDC 131 will be described with reference to position Lissajous figures. The position Lissajous figures in the followings are exemplified for the purpose of simple explanation, and thus it is not necessary to actually generate a position Lissajous figure upon carrying out the corrections of the demodulated signals A and B in the disk storage device 100.

The HDC 131 comprises an initial-phase correcting module 311, an azimuth correcting module 312, a velocity correcting module 313, and a head position demodulator 314. When the magnetic head 122 passes over a servo area, the HDC 131 in the foregoing configuration demodulates a positional signal of the magnetic head 122 after the various types of corrections are carried out on the demodulated signals received from the RDC 125.

Figure 5:
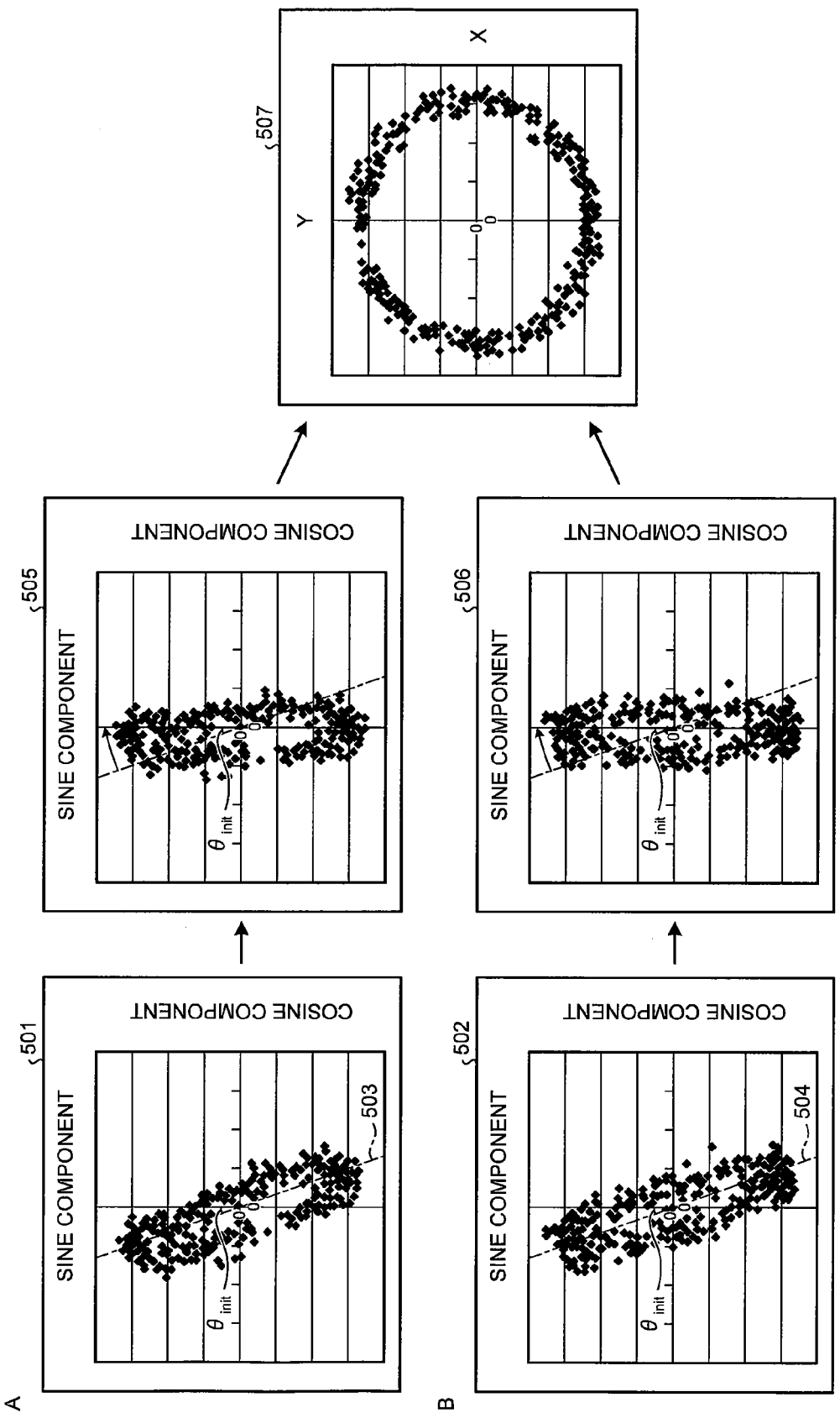
FIG. 5 is an exemplary group of charts illustrating the concept of correction of an initial-phase correcting module in the embodiment.

The initial-phase correcting module 311 carries out correction to tilt respective vectors of the demodulated signals A and B obtained by DFT operation represented on a phase plane by a predetermined angle. FIG. 5 illustrates the concept of correction of the initial-phase correcting module 311. As illustrated in FIG. 5, when sampled on a phase plane using sine components and cosine components of the demodulated signal A, a Lissajous figure as illustrated in a chart 501 is obtained. When sampled on a phase plane using sine components and cosine components of the demodulated signal B, a Lissajous figure as illustrated in a chart 502 is obtained.

Meanwhile, in conventional technologies, a phase angle θ is obtained only using sine components of the demodulated signal A and sine components of the demodulated signal B as described above. However, as illustrated in the chart 501 and the chart 502, the Lissajous figures are shaped like an ellipse and a major axis 503 of an elliptical shape in the chart 501 and a major axis 504 of an elliptical shape in the chart 502 are inclined by an angle $θ_{init}$ with respect to Y-axes. Due to the angle $θ_{init}$, there is a possibility of not accurately determining the position of the magnetic head 122. Therefore, the initial-phase correcting module 311 of the embodiment corrects the tilts before calculating a phase angle θ.

The initial-phase correcting module 311 of the embodiment carries out correction by multiplying a rotation matrix that gives a rotation of a predetermined angle $θ_{init}$ by respective vectors of the demodulated signal A and the demodulated signal B represented on a phase plane. A chart 505 in FIG. 5 illustrates the demodulated signal A after the correction to rotate over the predetermined angle $θ_{init}$ is carried out by the initial-phase correcting module 311. A chart 506 in FIG. 5 illustrates the demodulated signal B after the correction to rotate over the predetermined angle $θ_{init}$ is carried out by the initial-phase correcting module 311. The predetermined angle $θ_{init}$ is defined as a predetermined angle to correct the tilts between the respective Lissajous figures of the demodulated signal A and the demodulated signal B and the Y-coordinate axes. Because the predetermined angle $θ_{init}$ is different depending on disk storage devices and is determined by actual measurement, the explanation of a specific value is omitted.

In the disk storage device 100 of the embodiment, as illustrated in a chart 507 in FIG. 5, the sine components of the demodulated signal A after the correction are assigned on an X-coordinate, and the sine components of the demodulated signal B after the correction are assigned on the Y-coordinate. On the phase plane thus formed, a phase angle θ that is after the correction is carried out by the initial-phase correcting module 311 can be obtained from the direction of a vector.

Accordingly, in the embodiment, the correction to rotate by a predetermined angle $θ_{init}$ is carried out on the demodulated signals A and B. Thus, demodulating a positional signal representing an offset position of the magnetic head 122 using the demodulated signals A and B after the correction is carried out allows improving the determining accuracy of positions.

It has been described that a position Lissajous figure may not form a circle under certain conditions and may be deformed to a rectangular shape with rounded corners. This deformation is caused by a ratio of a width of the read core of the magnetic head 122 to a track pitch of a servo track writer (STW). In the embodiment, Sd is defined as Sd=(width of read core)/(track pitch of STW). Position Lissajous figures based on difference in Sd will be explained.

Figure 6:
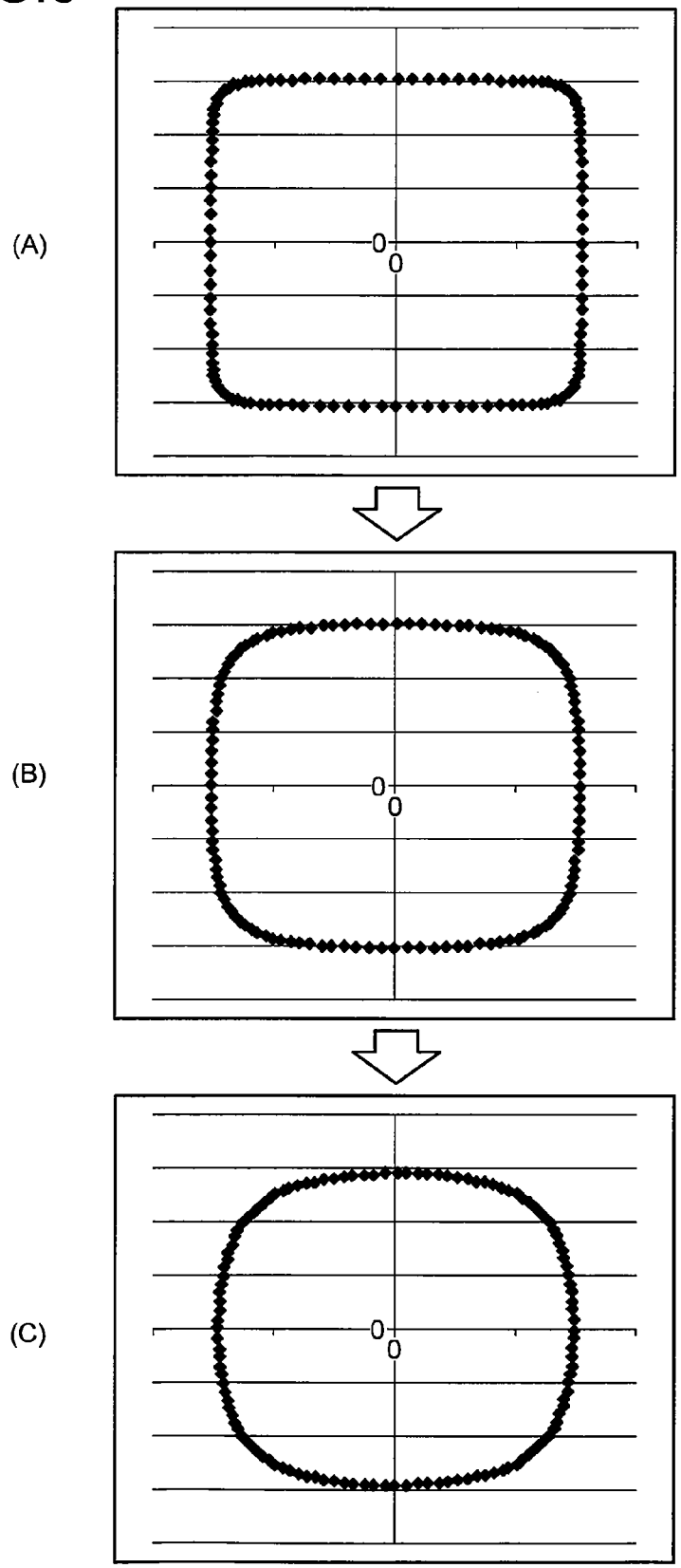
FIG. 6 is an exemplary group of charts illustrating position Lissajous figures based on the difference in Sd in the embodiment.

FIG. 6 illustrates examples of position Lissajous figures based on difference in Sd. FIG. 6(A) illustrates a position Lissajous figure when Sd is 0.14. FIG. 6(B) illustrates a position Lissajous figure when Sd is 0.18. FIG. 6(C) illustrates a position Lissajous figure when Sd is 0.22. As illustrated in FIGS. 6(A) to 6(C), the larger the Sd is, the closer to a circle the position Lissajous figure becomes. In other words, the wider the width of the read core of the magnetic head 122 is or the narrower the track pitch of an STW is, the closer to a circle the position Lissajous figure becomes. However, as the track pitch of the STW becomes narrower, it is necessary to further improve the determining accuracy of the position of the magnetic head 122. Therefore, the track pitch and the like of the STW are determined based on a balance between the determining accuracy of the position of the magnetic head 122 and the performance of the STW.

In the embodiment, the magnetic disk 111 is divided into three zones of inner, center, and outer zones at predetermined intervals in the radial direction (in-out direction) from the rotation center. The magnetic disk 111 may be divided at any intervals according to the mode of implementation.

Figure 7:
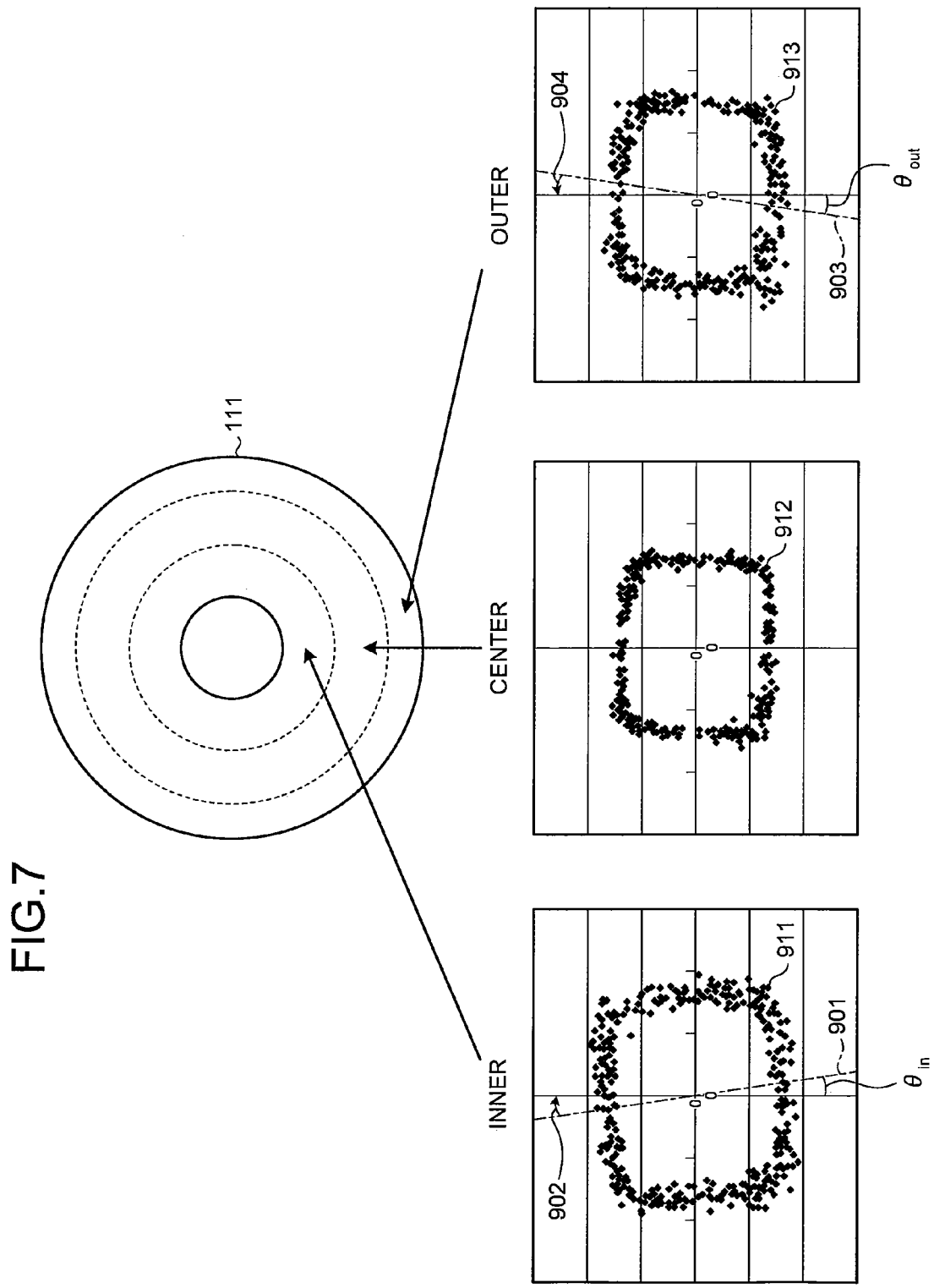
FIG. 7 is an exemplary group of diagrams illustrating the concept of correction of an azimuth correcting module in the embodiment.

The azimuth correcting module 312 then carries out correction to tilt respective vectors of the demodulated signals A and B represented on a phase plane by a different angle for respective zones from which positional information signals PosA and PosB that are origins of the demodulated signals A and B are read out, respectively. FIG. 7 illustrates the concept of correction of the azimuth correcting module 312. In the examples illustrated in FIG. 7, position Lissajous figures are of rectangular shapes with rounded corners. Although the position Lissajous figures illustrated in FIG. 7 are of rectangular shapes and are different in shape from the position Lissajous figure in FIG. 5, this is for the simplicity of the description. In the embodiment, the azimuth correcting module 312 corrects the demodulated signals A and B after being corrected by the initial-phase correcting module 311.

As illustrated in FIG. 7, position Lissajous figures before the correction by the azimuth correcting module 312 are an inner position Lissajous figure 911, a center position Lissajous figure 912, and an outer position Lissajous figure 913.

As illustrated in FIG. 7, the tilt of position Lissajous figure in a rectangular shape is different for each zone. For the inner zone, a position Lissajous figure is tilted at an angle $\theta_{in}$ from a Y-axis as indicated by an axis 901, and for the outer zone, it is tilted at an angle $\theta_{out}$ from a Y-axis in an opposite direction to that of the inner zone as indicated by an axis 903.

Therefore, the azimuth correcting module 312 multiplies the demodulated signals A and B for the inner zone by a rotation matrix that gives a rotation of only the angle $\theta_{in}$ in a direction indicated by an arrow 902. Meanwhile, the azimuth correcting module 312 multiplies the demodulated signals A and B for the outer zone by a rotation matrix that gives a rotation of only the angle $\theta_{out}$ in a direction indicated by an arrow 904. Accordingly, the tilt of position Lissajous figure in a rectangular shape different for each zone is corrected. With this, the accuracy in determining the position of the magnetic head 122 can be improved. The angle $\theta_{in}$ and the angle $\theta_{out}$ are different depending on disk storage devices and are determined by actual measurement, and thus the explanation of specific values is omitted.

After the correction by the azimuth correcting module 312 is carried out, the velocity correcting module 313 then carries out correction on the corrected demodulated signals A and B.

A description will be give of changes in position Lissajous figures while the actuator arm 115 is in a seek operation. For the simplicity of the description, an example in which a position Lissajous figure forms a circle when a seek operation using the actuator arm 115 is not performed is explained.

In the disk storage device 100 of the embodiment, if a seek operation is performed using the actuator arm 115, a position Lissajous figure forms an ellipse in response to a moving velocity of the actuator arm 115. The shape of the ellipse changes by whether forward seek is carried out or backward seek is carried out. When a position Lissajous figure becomes elliptic, a phase angle $\theta$ is not changed linearly, whereby the determining accuracy of positions is lowered. Therefore, the velocity correcting module 313 of the disk storage device 100 of the embodiment carries out correction to make a position Lissajous figure in an elliptic shape form a circle.

Figure 8:
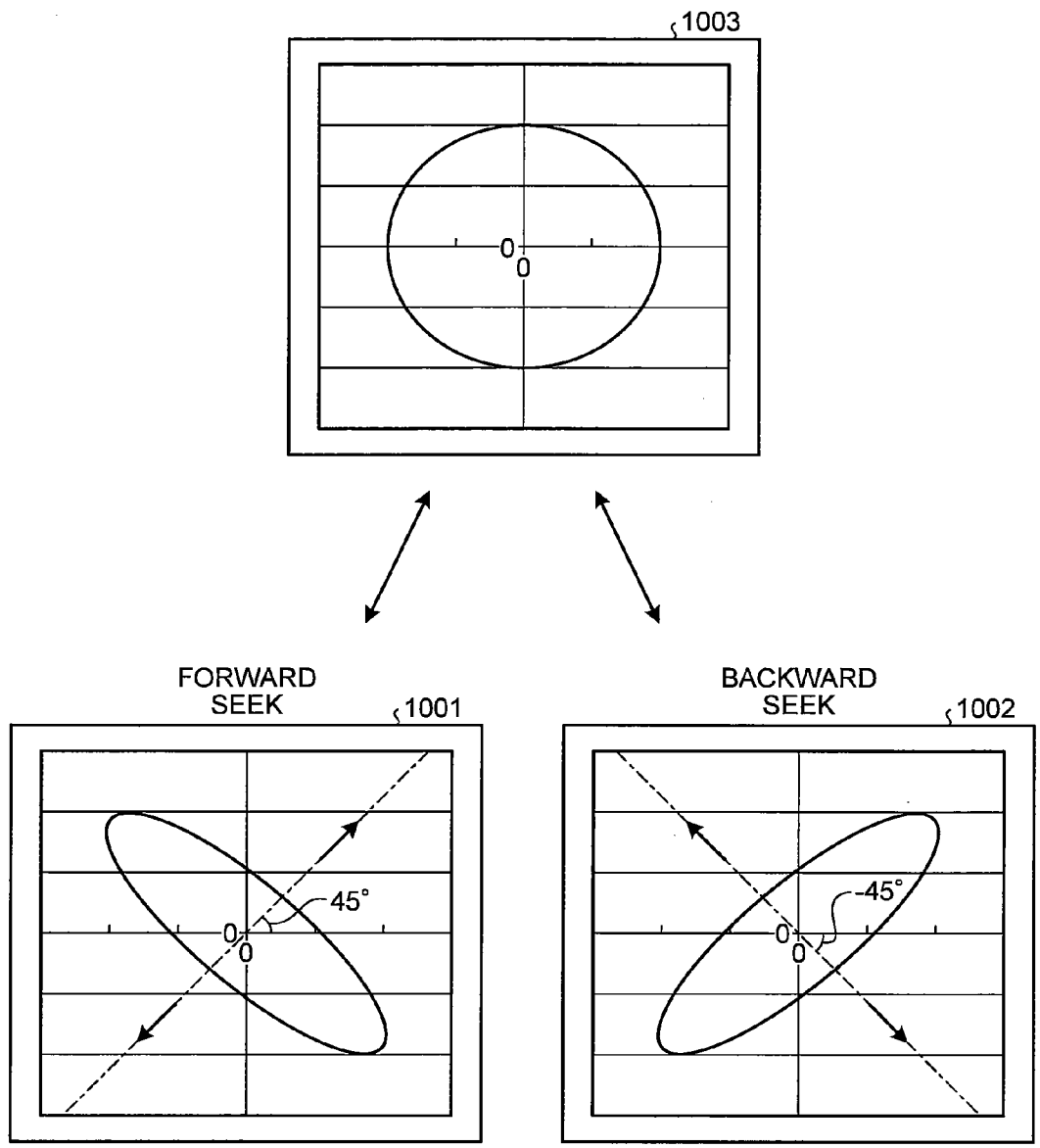
FIG. 8 is an exemplary group of charts illustrating the concept of correction of a velocity correcting module in the embodiment.

FIG. 8 illustrates the concept of correction of the velocity correcting module 313. A chart 1001 in FIG. 8 illustrates a position Lissajous figure resulted in an elliptic shape by forward seek, and a chart 1002 illustrates a position Lissajous figure resulted in an elliptic shape by backward seek. As illustrated in FIG. 8, it is assumed that, in the case of forward seek, the position Lissajous figure is in an elliptic shape with its minor axis in a 45 degree direction, and in the case of backward seek, the position Lissajous figure is in an elliptic shape with its minor axis in a −45 degree direction. Accordingly, in forward seek, the velocity correcting module 313 of the embodiment multiplies vectors of the demodulated signals A and B represented on a phase plane by a rotation matrix that gives rotation by 45 degrees, then multiplies the vectors by an augmented matrix that increases one-and-a-half times in an X-axis direction, and finally multiplies the vectors by a rotation matrix that gives rotation by −45 degrees. Consequently, correction to extend in a minor axis direction is made on the position Lissajous figure of an elliptic shape, and thus the position Lissajous figure is corrected into a circle shape as illustrated in a chart 1003 in FIG. 8. Meanwhile, in backward seek, carrying out a process of similar intent can also correct the position Lissajous figure into a circle shape.

The correction by the velocity correcting module 313 allows improving linearity in determining the position of the read core even when the actuator arm 115 has a moving velocity.

The head position demodulator 314 comprises a linearity correcting module 321, and based on the demodulated signals A and B after being corrected by the various correction methods, demodulates a positional signal of the read core of the magnetic head 122. The head position demodulator 314 of the embodiment receives the demodulated signals A and B after being corrected, and outputs a phase angle $\theta$ indicative of a direction of a vector formed by the demodulated signals A and B on a phase plane as a positional signal of the magnetic head 122. This allows the position of the magnetic head 122 to be determined.

When the head position demodulator 314 carries out demodulation of position, the linearity correcting module 321 carries out correction to improve linearity of changes in position (phase angle $\theta$) determined as the read core based on the changes in the demodulated signals A and B. More specifically, when a position Lissajous figure is a circle, because the linearity of position (phase angle $\theta$) determined as the read core is high, whereby the accuracy of the position of the read core determined as a head becomes high. However, the linearity of position (phase angle $\theta$) determined as the read core is lowered as the position Lissajous figure becomes closer to a rectangular shape, whereby the determining accuracy of the position of the read core of the head becomes lower. Therefore, in the embodiment, correction to improve the linearity is carried out.

In conventional technologies, if a position Lissajous figure is a circle, the position (phase angle $\theta$) of the read core of the magnetic head 122 is calculated using a function of arctan(x). The variable x is defined as x=|demodulated signal B component|/|demodulated signal A component|when |demodulated signal B component|≤|demodulated signal A component|, and as x=|demodulated signal A component|/|demodulated signal B component|when |demodulated signal B component|>|demodulated signal A component|. The demodulated signal A component is defined as a sine component of the demodulated signal A, and the demodulated signal B component is defined as a sine component of the demodulated signal B. However, when a position Lissajous figure is not a circle, but a rectangle, the detecting accuracy of positions becomes low if calculated by arctan(x).

Accordingly, the head position demodulator 314 of the embodiment demodulates a phase angle θ representing the read core, i.e., the position of the read core, based on a value calculated using the following quadratic polynomial (1):

$$(1-G_m)x+G_m x^2 \quad (1)$$

where $G_m$ is a coefficient defined to perform correction to improve linearity.

Figure 9:
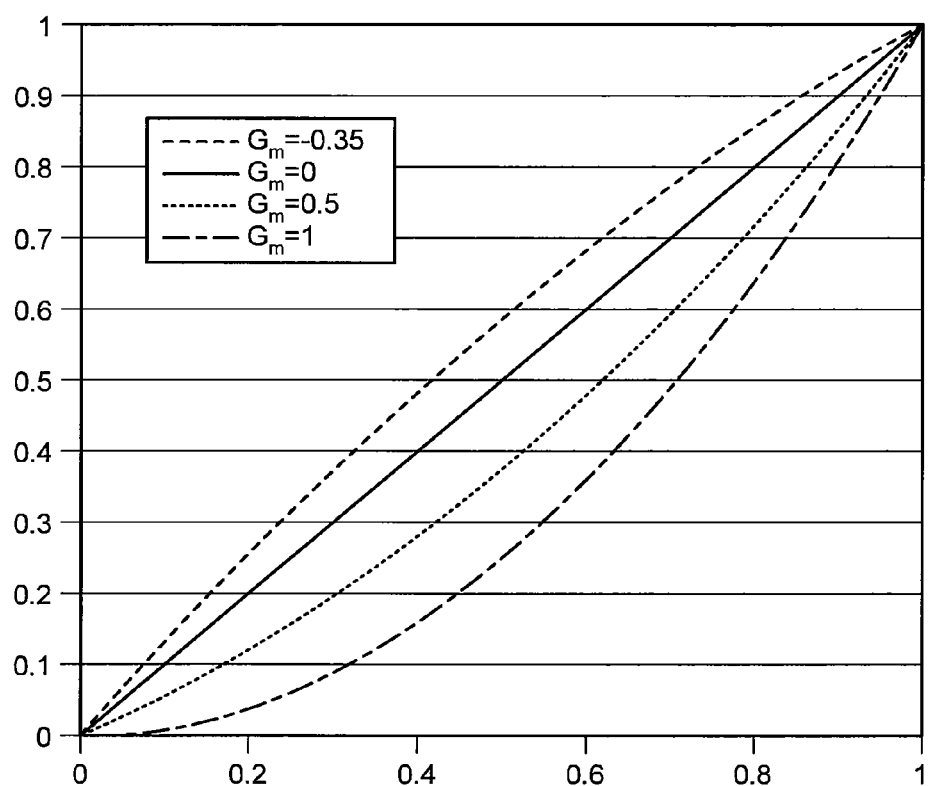
FIG. 9 is an exemplary chart illustrating operation results of quadratic polynomial (1) by the difference in coefficient $G_m$ in the disk storage device in the embodiment.

FIG. 9 is a chart illustrating operation results of the quadratic polynomial (1) by the difference in coefficient $G_m$. When the head position demodulator 314 demodulates position using a coefficient $G_m$ of −0.35, obtained is the position (phase angle θ) of the read core similar to that of when arctan(x) is used. As illustrated in FIG. 9, as the value of coefficient Gm is increased from the coefficient $G_m$ of −0.35, the curves have more concave curvatures compared with that of when arctan(x) is used, and thus it can be confirmed that the degree of linearity correction becomes large. Consequently, in the head position demodulator 314 of the embodiment, the value calculated using the expression (1) is defined as the phase angle θ allows improving linearity in determining position compared with that of when arctan(x) is used. The coefficient $G_m$ is determined based on a shape of position Lissajous figure, more specifically, a width of the read core of the magnetic head 122 and a track pitch of an STW.

Figure 10:
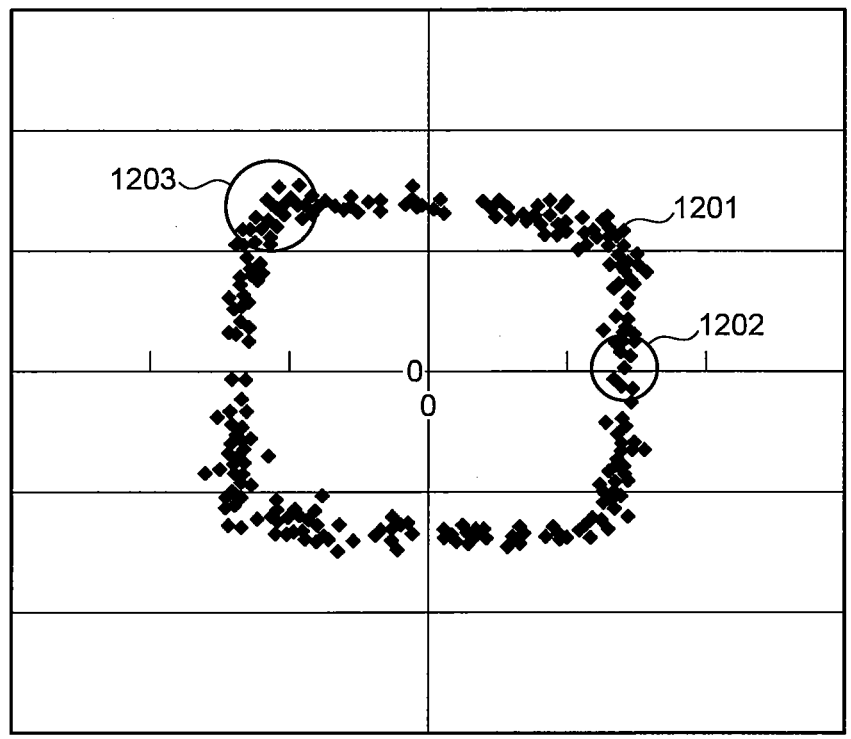
FIG. 10 is an exemplary chart illustrating position Lissajous figure represented as the subject of linearity correction in the disk storage device in the embodiment.

FIG. 10 illustrates an example of position Lissajous figure represented as a subject of linearity correction. In the position Lissajous figure illustrated in FIG. 10, the Lissajous figure becomes flat at positions where axes of 0 degree, 90 degrees, 180 degrees, and 270 degrees orthogonally cross and has roundness at corners in 45 degree directions. The situation of using the above quadratic polynomial on the position Lissajous figure 1201 illustrated in FIG. 10 will be explained.

Upon using the quadratic polynomial (1), the demodulated signal A component and the demodulated signal B component need to be in absolute values. Furthermore, although the quadratic polynomial (1) is useful when used while x is between 0 and 1, it is not considered for when a vector representing the demodulated signals A and B on a phase plane varies between 0 and 2π. Therefore, in the embodiment, it is necessary to extend the quadratic polynomial (1) so that an appropriate value can be obtained depending on a situation.

Figure 11:
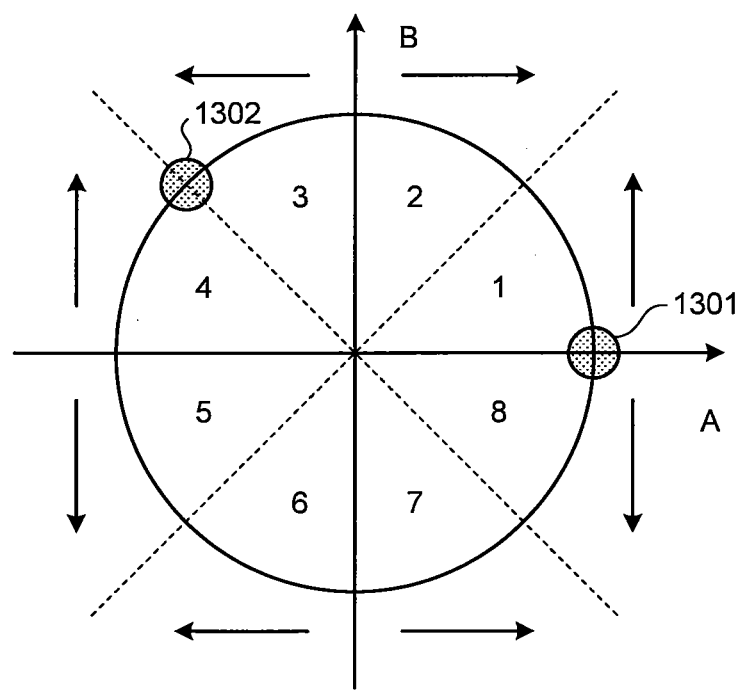
FIG. 11 is an exemplary explanatory diagram illustrating divided domains of a position Lissajous figure as octants of a phase plane in the disk storage device in the embodiment.

FIG. 11 illustrates divided domains on a position Lissajous figure as octants on a phase plane based on the difference in variable x of |demodulated signal B component|/|demodulated signal A component| or its inverse of |demodulated signal A component|/|demodulated signal B component|. In the phase plane illustrated in FIG. 11, the Lissajous figure is divided, at 45 degree intervals in the counter-clockwise direction, into octants of a first octant, a second octant, a third octant, a fourth octant, a fifth octant, a sixth octant, a seventh octant, and an eighth octant.

Figures 12, 13:
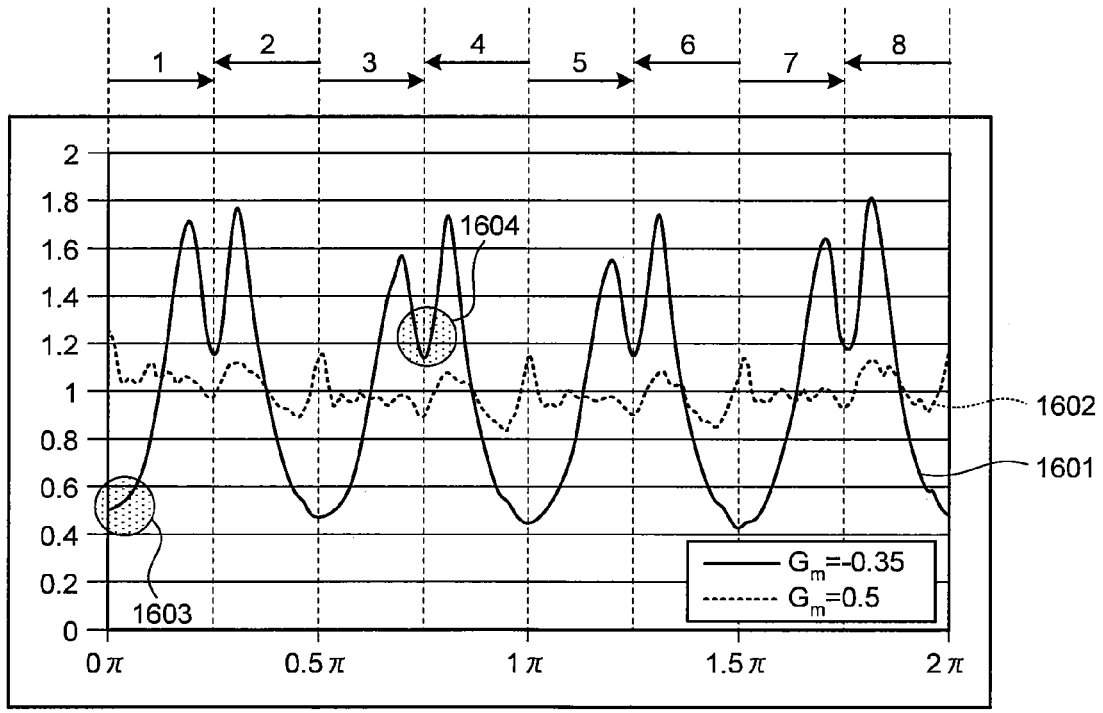
FIG. 12 is an exemplary table explaining position calculating methods for the domains of the position Lissajous figure illustrated in FIG. 11 determined based on a demodulated signal A component and a demodulated signal B component in the embodiment.
FIG. 13 is an exemplary chart illustrating linearity in the case where the position calculating methods indicated in FIG. 12 are applied to represent the position Lissajous figure illustrated in FIG. 10 in the embodiment.

FIG. 12 is a table explaining position calculating methods for domains of the position Lissajous figure illustrated in FIG. 11 determined based on demodulated signal A components and demodulated signal B components according to the embodiment. The position (phase angle) of the read core of the magnetic head 122 is demodulated using a position calculating method different for each domain illustrated in FIG. 12. As illustrated in FIG. 12, by the combination of whether the demodulated signal A component is greater than zero, whether the demodulated signal B component is greater than zero, and whether |demodulated signal B component|<|demodulated signal A component| is held true, one of the domains 1 to 8 is determined. The variable x is then determined as |demodulated signal B component|/|demodulated signal A component| or |demodulated signal A component|/|demodulated signal B component| according to the determined domain. Furthermore, a position calculating method is determined according to the determined domain. The func(x) indicated in FIG. 12 is defined as the following quadratic polynomial (2):

$$\text{func}(x)=((1-G_m)x+G_m x^2)\times 0.25 \quad (2)$$

In the head position demodulator 314 of the embodiment, by differentiating a position calculating method in response to the domain determined, the quadratic polynomial is extended.

The linearity upon determining position using the calculating methods will be explained. FIG. 13 is a chart illustrating linearity of when the above position calculating methods are applied to the situation represented by the position Lissajous figure illustrated in FIG. 10. In the example illustrated in FIG. 13, a line 1601 represents the linearity of when a coefficient $G_m$ of −0.35, i.e., arctan(x), is applied, and a line 1602 represents the linearity of when a coefficient $G_m$ of 0.5 is applied. As illustrated in FIG. 13, with the coefficient $G_m$ of 0.5, compared with that of the coefficient $G_m$ of −0.35, values close to 1 are kept in the range of 0 to 2π. Accordingly, with the coefficient $G_m$ of 0.5, compared with the coefficient $G_m$ of −0.35, higher linearity is maintained.

Specifically, in the position Lissajous figure illustrated in FIG. 10, because a straight line is drawn in a range 1202, the sensitivity of position demodulation is low, and because an arc is drawn in a range 1203, the sensitivity of position demodulation is high. Furthermore, the range 1202 in FIG. 10 corresponds to a range 1301 on the phase plane illustrated in FIG. 11, and the range 1203 in FIG. 10 corresponds to a range 1302 on the phase plane illustrated in FIG. 11. Therefore, on the chart illustrated in FIG. 13, when the coefficient $G_m$ is −0.35, the range 1202 in FIG. 10 corresponds to a range 1603, and the range 1203 in FIG. 10 corresponds to a range 1604. As illustrated in FIG. 13, at places of low demodulation sensitivity such as the range 1202 of the position Lissajous figure, the linearity is low with the coefficient $G_m$ of −0.35, but with the coefficient $G_m$ of 0.5, high linearity can be ensured. Moreover, even at places of high demodulation sensitivity such as the range 1203 of the position Lissajous figure, compared with that of the coefficient $G_m$ of −0.35, the coefficient $G_m$ of 0.5 allows higher linearity to be ensured.

Consequently, in the situation represented by the position Lissajous figure illustrated in FIG. 10, that the head position demodulator 314 uses the position calculating methods indicated in FIG. 12 substituted with the coefficient $G_m$ of 0.5 to demodulate the positional signal of the read core of the magnetic head 122 can determine the position with high accuracy.

The head position demodulator 314 of the embodiment outputs, as a positional signal of the read core of the magnetic head 122, a phase angle θ calculated using the quadratic polynomial with the variable x that indicates the ratio between the absolute value of the demodulated signal A component and the absolute value of the demodulated signal B component after being corrected by the above correction methods and the coefficient $G_m$ that is defined to perform correction to improve linearity. Specifically, using the position calculating method indicated in FIG. 12 and using the coefficient $G_m$ appropriate for Sd allow improving the determining accuracy of positions. The coefficient $G_m$ differs depending on the above conditions and is a value determined by actual measurement, and thus an explanation about a specific value is omitted.

Figure 14:
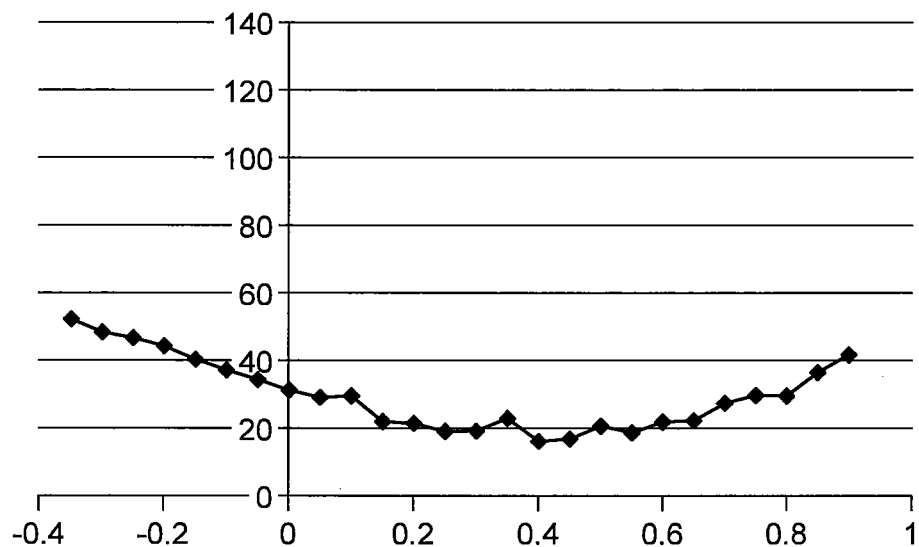
FIG. 14 is an exemplary chart illustrating a degree of variation in linearity of phase angle θ when the position Lissajous figure illustrated in FIG. 6(A) is drawn in the embodiment.

The degree of variation (probability density) in linearity obtained from a position Lissajous figure will be explained. FIG. 14 is a chart illustrating the degree of variation in linearity of phase angle θ when Sd is 0.14 and the position Lissajous figure as illustrated in FIG. 6(A) is drawn. The ordinate axis represents linearity and the abscissa axis represents coefficient $G_m$. The smallest value out of the degrees of variation in linearity illustrated in FIG. 14 is defined as an optimal value. In FIG. 14, the use of a coefficient $G_m$ that renders the least degree of variation (0.4 in FIG. 14) obtains the positions of the read core with high accuracy.

Figure 15:
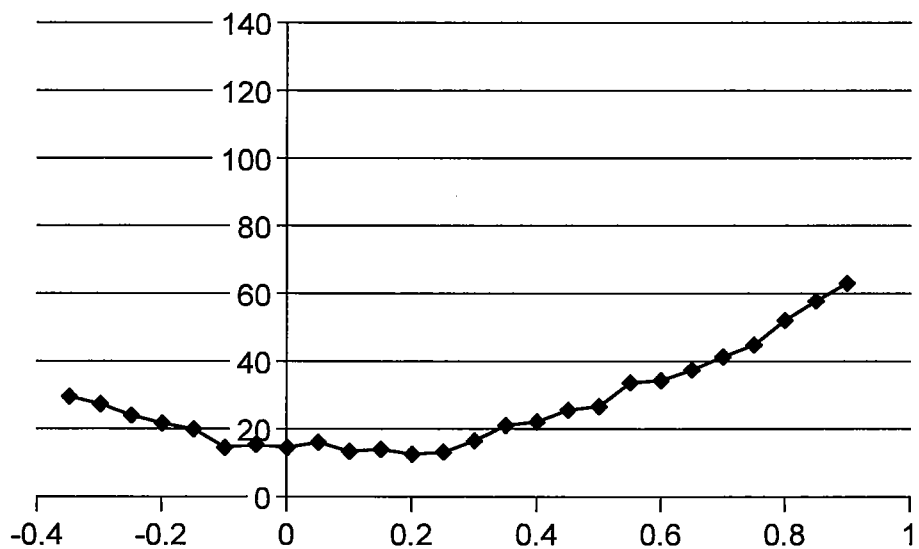
FIG. 15 is an exemplary chart illustrating a degree of variation in linearity of phase angle θ when the position Lissajous figure illustrated in FIG. 6(B) is drawn in the embodiment.

FIG. 15 is a chart illustrating the degree of variation in linearity of phase angle θ when Sd is 0.18 and the position Lissajous figure as illustrated in FIG. 6(B) is drawn. In FIG. 15, the use of a coefficient $G_m$ of 0.2 that renders the least degree of variation allows obtaining the positions of the read core with high accuracy.

Figure 16:
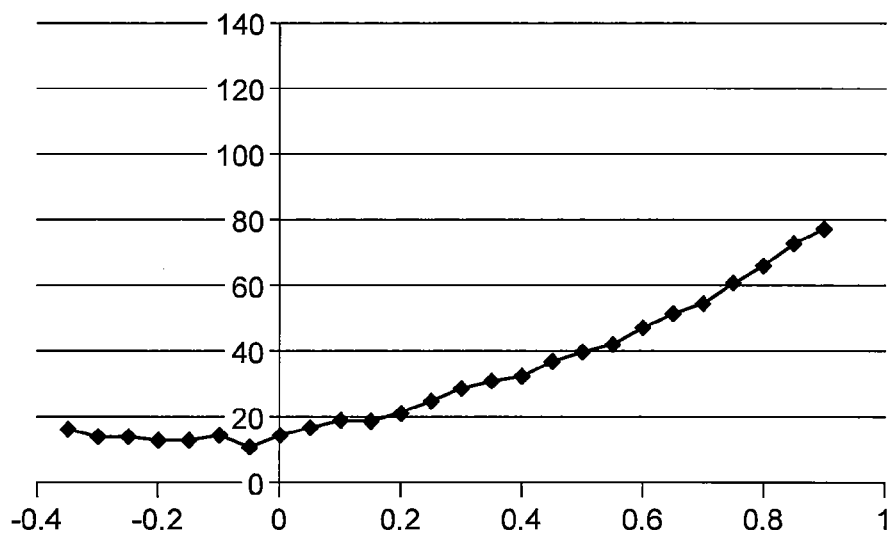
FIG. 16 is an exemplary chart illustrating a degree of variation in linearity of phase angle θ when the position Lissajous figure illustrated in FIG. 6(C) is drawn in the embodiment.

FIG. 16 is a chart illustrating the degree of variation in linearity of phase angle θ when Sd is 0.22 and the position Lissajous figure as illustrated in FIG. 6(C) is drawn. In FIG. 16, the use of a coefficient $G_m$ of −0.05 that renders the least degree of variation allows obtaining the positions of the read core with high accuracy.

As illustrated in FIGS. 14 to 16, it can be perceived that the degree of variation in linearity becomes smaller as a position Lissajous figure becomes closer to a circle from a rectangle, and thus the accuracy of read core position is improved. However, it can be seen that, even when a position Lissajous figure is close to a rectangle, the linearity correction of the embodiment can make the degree of variation in linearity relatively small. Therefore, the accuracy of positions and specifications of an STW only need to be considered to determine the track pitch of the STW.

The correction to improve linearity illustrated in the linearity correcting module 321 is not restricted to when null demodulation is used, but is also applicable to other demodulation methods. For example, it can be applied to a disk storage device that determines the position of the head using area demodulation.

In the embodiment, the fact that the head position demodulator 314 uses the quadratic polynomial (2) to determine the position of the magnetic head 122 can improve the accuracy of determining position. Furthermore, a quadratic polynomial is easily calculated compared with polynomials of third order or more, and thus processing load can be reduced.

A description will be given of the process of determining the position of the magnetic head 122 in the disk storage device 100 according to the embodiment. FIG. 17 is a flowchart of the process in the disk storage device 100 of the embodiment.

First, the read core of the magnetic head 122 reads out positional information signals PosA and PosB from a null servo pattern (S2001).

The null demodulator 331 then carries out DFT (discrete Fourier transform) operation on the positional information signals PosA and PosB to demodulate demodulated signals A and B (S2002).

Thereafter, the initial-phase correcting module 311 carries out correction to tilt respective vectors of the demodulated signals A and B represented on a phase plane by a predetermined angle (S2003).

The azimuth correcting module 312 then carries out correction to tilt respective vectors of the demodulated signals A and B represented on a phase plane by an angle different for each zone that contains the positional information signals PosA and PosB that are origins of the demodulated signals A and B, respectively (S2004).

The velocity correcting module 313 then carries out correction to make a position Lissajous figure in an elliptic shape represented by the demodulated signals A and B form a circle (S2005).

The head position demodulator 314 then demodulate a positional signal while improving the linearity of phase angle of the read core that is determined based on the demodulated signals A and B using the linearity correcting module 321 (S2006).

By the process as described above, in the disk storage device 100 of the embodiment, the positional signal is demodulated after the various corrections are carried out in the HDC 131.

In the embodiment, while the corrections are carried out in the order of the initial phase correction, the azimuth correction, the velocity correction, and the linearity correction, the order of corrections is not restricted and may be carried out in no particular order. Furthermore, it is not necessary to carry out all of the initial phase correction, the azimuth correction, the velocity correction, and the linearity correction, and as long as one or more of the corrections are carried out, the determining accuracy of offset position of the magnetic head 122 can be improved. Moreover, the correction may be combined with other corrections.

According to the embodiment, the disk storage device 100 corrects the demodulated signals A and B using at least one of the above correction methods. This improves accuracy in the positioning of the magnetic head 122.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A position demodulator comprising:
 a demodulator configured to demodulate a first demodulated signal and a second demodulated signal having a phase difference of 90 degrees from the first demodulated signal, wherein the first and second demodulated signals are obtained as a result of a discrete Fourier transform operation on a read signal of a null servo pattern recorded in a servo area of a medium read out by a head;
 a phase corrector configured to carry out correction of the first demodulated signal and the second demodulated signal by tilting respective vectors of the first demodulated signal and the second demodulated signal by a predetermined angle, the vectors being represented on a phase plane using a sine component and a cosine component of each of the first demodulated signal and the second demodulated signal as values on coordinate axes that are different from each other; and a position demodulating module configured to demodulate a positional signal for determining a position of a core of the head based on the first demodulated signal and the second demodulated signal corrected by the phase corrector.

2. The position demodulator of claim 1, wherein the predetermined angle is an angle to correct a tilt between Lissajous figures generated on the phase plane using the first demodulated signal and the second demodulated signal, and a coordinate axis of the phase plane.

3. The position demodulator of claim 1, wherein the position demodulating module is configured to output, as the positional signal, an operation result using a quadratic polynomial with a coefficient predetermined to carry out correction to improve linearity of the first demodulated signal and the second demodulated signal, and a variable determined by a ratio between an absolute value of the first demodulated signal and an absolute value of the second demodulated signal corrected by the phase corrector.

4. The position demodulator of claim 3, wherein the position demodulating module is configured to use, as the quadratic polynomial to output the positional signal, an expression:

$$(1-G_m)x+G_m x^2$$

where x is | the first demodulated signal |/| the second demodulated signal | or | the second demodulated signal |/| the first demodulated signal |, and $G_m$ is the coefficient determined to carry out the correction to improve the linearity.

5. The position demodulator of claim 1, wherein the medium is a disk medium, areas of which divided at predetermined intervals in a radial direction from a rotation center are defined as zones,
the position demodulator further comprising an azimuth corrector configured to carry out correction to tilt the respective vectors of the first demodulated signal and the second demodulated signal represented on the phase plane by a different angle for each of the zones from which the read signal is read out, wherein
the position demodulating module is configured to use the first demodulated signal and the second demodulated signal corrected by the azimuth corrector.

6. A position demodulation method applied to a position demodulator, the position demodulation method comprising:
demodulating a first demodulated signal and a second demodulated signal having a phase difference of 90 degrees from the first demodulated signal, wherein the first and second demodulated signals are obtained as a result of a discrete Fourier transform operation on a read signal of a null servo pattern recorded in a servo area of a medium read out by a head;
carrying out correction of the first demodulated signal and the second demodulated signal by tilting respective vectors of the first demodulated signal and the second demodulated signal by a predetermined angle, the vectors being represented on a phase plane using a sine component and a cosine component of each of the first demodulated signal and the second demodulated signal as values on coordinate axes that are different from each other; and
demodulating a positional signal for determining a position of a core of the head based on the first demodulated signal and the second demodulated signal corrected by the correction.

7. The position demodulation method of claim 6, wherein the demodulating comprises outputting, as the positional signal, an operation result using a quadratic polynomial with a coefficient predetermined to carry out correction to improve linearity and a variable determined by a ratio between an absolute value of the first demodulated signal and an absolute value of the second demodulated signal corrected by the correction to tilt.

8. The position demodulation method of claim 7, wherein the demodulating uses, as the quadratic polynomial to output the positional signal, an expression:

$$(1-G_m)x+G_m x^2$$

where x is | the first demodulated signal |/| the second demodulated signal | or | the second demodulated signal |/| the first demodulated signal |, and $G_m$ is the coefficient determined to carry out the correction to improve the linearity.

9. The position demodulation method of claim 6, wherein the predetermined angle is an angle to correct a tilt between Lissajous figures generated on the phase plane using the first demodulated signal and the second demodulated signal, and a coordinate axis of the phase plane.

10. The position demodulation method of claim 6, wherein the medium is a disk medium, areas of which divided at predetermined intervals in a radial direction from a rotation center are defined as zones,
the position demodulation method further comprising carrying out correction to tilt the respective vectors of the first demodulated signal and the second demodulated signal represented on the phase plane by a different angle for each of the zones from which the read signal is read out, wherein
the positional signal is demodulated using the first demodulated signal and the second demodulated signal corrected by the correction to tilt.

* * * * *